(12) United States Patent
Ishii

(10) Patent No.: US 11,377,138 B2
(45) Date of Patent: Jul. 5, 2022

(54) GEAR HOUSING FOR ELECTRIC POWER STEERING DEVICE, MANUFACTURING METHOD THEREOF, AND ELECTRIC POWER STEERING DEVICE

(71) Applicant: NSK LTD., Tokyo (JP)

(72) Inventor: Takayuki Ishii, Gunma (JP)

(73) Assignee: NSK, Ltd., Tokyo (JP)

( * ) Notice: Subject to any disclaimer, the term of this patent is extended or adjusted under 35 U.S.C. 154(b) by 195 days.

(21) Appl. No.: 16/758,483

(22) PCT Filed: Oct. 25, 2018

(86) PCT No.: PCT/JP2018/039780
§ 371 (c)(1),
(2) Date: Apr. 23, 2020

(87) PCT Pub. No.: WO2019/087945
PCT Pub. Date: May 9, 2019

(65) Prior Publication Data
US 2020/0255057 A1    Aug. 13, 2020

(30) Foreign Application Priority Data
Oct. 30, 2017    (JP) .............................. JP2017-209665

(51) Int. Cl.
*B62D 5/04*    (2006.01)
(52) U.S. Cl.
CPC ......... *B62D 5/0454* (2013.01); *B62D 5/0403* (2013.01)
(58) Field of Classification Search
CPC ............................ B62D 5/0454; B62D 5/0403
See application file for complete search history.

(56) References Cited

U.S. PATENT DOCUMENTS

| 6,014,915 A | 1/2000 | Evans |
| 2001/0026105 A1 | 10/2001 | Torii et al. |

FOREIGN PATENT DOCUMENTS

| JP | 2002-517694 | 6/2002 |
| JP | 2003072562 | 3/2003 |

(Continued)

OTHER PUBLICATIONS

Notice of Reasons for Refusal dated Dec. 8, 2020 for Patent Application 2019-550304, https://www.j-piatpat.inpit.go.jp/h0101, English Translation dated Dec. 21, 2020, 11 pages.

(Continued)

*Primary Examiner* — Kevin Hurley
(74) *Attorney, Agent, or Firm* — Hartman Global IP Law; Gary M. Hartman; Domenica N. S. Hartman

(57) ABSTRACT

A gear housing for an electric power steering device has a front-side housing and a rear-side housing. The front-side housing has a worm wheel housing portion, a worm housing portion, and reinforcing ribs. The worm wheel housing portion has a worm wheel cylindrical portion and a ring shaped worm wheel bottom portion bent inward in a radial direction from a front end portion of the worm wheel cylindrical portion. The worm housing portion is provided on a part in a circumferential direction of an outer-diameter side portion of the worm wheel housing portion. The reinforcing ribs are provided on a front side surface of the front-side housing, extend in a direction in which an engagement reaction force acts between the worm wheel and a worm of the worm shaft, and span between the worm housing portion and the worm wheel bottom portion.

8 Claims, 14 Drawing Sheets

(56) References Cited

FOREIGN PATENT DOCUMENTS

| | | | |
|---|---|---|---|
| JP | 2003072562 A | * | 3/2003 |
| JP | 2012-020647 | | 2/2012 |
| JP | 2012176632 | | 9/2012 |
| JP | 2015013638 | | 1/2015 |
| JP | 2015094375 | | 5/2015 |
| JP | 2017-024702 | | 2/2017 |
| WO | 99/64766 | | 12/1999 |
| WO | 2016-084659 | | 6/2016 |

OTHER PUBLICATIONS

International Search Report for International Application No. PCT/JP2018/039780, dated Jan. 22, 2019, (1 page).
European Search Report for European Application No. EP 18873158 (PCT/JP2018-039780) dated Sep. 29, 2021, 9 pages.

* cited by examiner

GEAR HOUSING FOR ELECTRIC POWER STEERING DEVICE, MANUFACTURING METHOD THEREOF, AND ELECTRIC POWER STEERING DEVICE

CROSS REFERENCE TO RELATED APPLICATIONS

This application claims the benefit of PCT/JP2018/039780 filed Oct. 25, 2018, having a priority claim to Japanese Patent Application No. 2017-209665, filed Oct. 30, 2017. The contents of these prior patent documents are incorporated herein by reference.

TECHNICAL FIELD

The present invention relates to an electric power steering device, and in particular, relates to a gear housing for an electric power steering device for housing a worm reducer of the electric power steering device.

BACKGROUND ART

FIG. 13 illustrates an example of a conventional structure of an electric power steering device. The electric power steering device includes a steering shaft 2, a cylindrical steering column 3 that rotatably supports the steering shaft 2 on the inside thereof, an electric power assist device 4 for providing auxiliary power for reducing the force required for the driver to operate the steering wheel 1, and a universal joint 5a, an intermediate shaft 6, and a universal joint 5b that transmit the rotation of the steering shaft 2 to a pinion shaft 8 of a steering gear unit 7. The steering wheel 1 is fixed to the rear end portion of the steering shaft 2. Movement of the steering wheel 1 during steering is transmitted to the pinion shaft 8 via the steering shaft 2, the electric power assist device 4, the universal joint 5a, the intermediate shaft 6, and the universal joint 5b. The rotation of the pinion shaft 8 pushes and pulls a pair of tie rods 9 arranged on both sides of the steering gear unit 7, and a steering angle corresponding to the operation amount of the steering wheel 1 is applied to a pair of left and right steered wheels. Note that the front-rear direction refers to the front-rear direction of the vehicle body in which the electric power steering device is assembled.

FIG. 14 illustrates the specific structure of an electric power assist device as described in WO 2016/084659. The electric power assist device 4a is arranged at the front of the steering column 3, and includes a torque sensor 10 for measuring a steering torque that is inputted from the steering wheel 1 to the steering shaft 2, an electric motor 11 that generates auxiliary power in a state in which energization is controlled based on a measurement signal from the torque sensor 10, a worm reducer 12 that applies auxiliary power from the electric motor 11 to the output shaft 13, and a gear housing 14 that is fixed to the front end portion of the steering column 3 and houses the torque sensor 10 and the worm reducer 12.

The gear housing 14 includes a front-side housing 15 and a rear-side housing 16 that are arranged in the front-rear direction and are joined by a plurality of bolts. The front-side housing 15 includes a cup-shaped worm wheel housing portion 17 that is open to the rear, and a cylindrical worm housing portion 18 that is arranged in part of the outer-diameter portion of the worm wheel housing portion 17 in the circumferential direction (upper end portion in the illustrated example). The worm wheel housing portion 17 includes a mounting stay 19 that protrudes toward the front and supports the gear housing 14 with respect to the vehicle body.

The worm reducer 12 includes a worm wheel 20 that is externally fitted and fixed to the output shaft 13, and a worm shaft 21 that is connected to the output shaft of the electric motor 11. The worm wheel 20 is housed inside the worm wheel housing portion 17. The worm shaft 21 is housed inside the worm housing portion 18. The worm shaft 21 includes a worm 22 provided in the intermediate portion thereof; and the worm 22 and the worm wheel 20 engage.

The output shaft 13 is rotatably supported inside the gear housing 14 and is connected via a torsion bar 24 to a coaxially arranged input shaft 23. The front end portion of the output shaft 13, as illustrated in FIG. 13, is connected to the pinion shaft 8 via the pair of universal joints 5a, 5b and the intermediate shaft 6. The rear end portion of the input shaft 23 is connected to the front end portion of the steering shaft 2. When the steering wheel 1 is operated, due to the steering torque applied to the input shaft 23 via the steering shaft 2 and the resistance to rotation of the output shaft 13, the input shaft 23 and the output shaft 13 relatively displace in the direction of rotation while causing the torsion bar 24 to elastically deform. The amount of relative displacement between the input shaft 23 and the output shaft 13 is measured by the torque sensor 10. A controller (not illustrated) controls the electric motor 11 according to a measurement signal from the torque sensor 10, and auxiliary power (auxiliary torque) from the electric motor 11 is applied to the output shaft 13 via the worm reducer 12.

CITATION LIST

Patent Literature

Patent Literature 1: WO 2016/084659

SUMMARY OF THE INVENTION

Problems to be Solved by the Invention

In recent years, there is an increasing demand for lower fuel consumption of automobiles, and further weight reduction of the components of automobiles is being promoted. In view of such circumstances, reducing the weight of the gear housing assembled in an electric power steering device by reducing the thickness is being studied. However, when the rigidity of the gear housing is reduced by reducing the thickness, there is a possibility that the gear housing will not be able to sufficiently support the reaction force due to engagement between the worm wheel and the worm that acts on the gear housing when the electric motor is driven.

Moreover, the gear housing is a part made by casting or injection molding, so in order to reduce the thickness of the gear housing, it is necessary to reduce the cross-sectional area of the space (cavity) through which the material flows. Therefore, the flow of the material becomes poor, and there is a possibility that the moldability of the gear housing will be reduced. Particularly, in a case where the front-side housing includes a mounting stay that projects a large amount toward the front, there is a possibility that the material will not be sufficiently supplied to the space for forming the mounting stay. When reducing the thickness of the gear housing in this way, there are problems such as a decrease in product quality and a reduction in product strength.

In view of the circumstances described above, an object of the present invention is to achieve a structure of a gear housing for an electric power steering device that is capable of maintaining rigidity and also moldability (material fluidity) during manufacturing even in a case where the thickness is reduced.

Means for Solving the Problems

The gear housing for an electric power steering device of the present invention constitutes an electric power steering device and includes a front-side housing and a rear-side housing that are combined in a front-rear direction directly or via another member such as an intermediate plate or the like.

The front-side housing includes: a worm wheel housing portion that houses a worm wheel inside, a worm housing portion that houses a worm shaft inside, and one or more reinforcing ribs.

The worm wheel housing portion has: a worm wheel cylindrical portion that is arranged around the worm wheel; and a ring shaped worm wheel bottom portion that is bent inward in a radial direction from a front end portion of the worm wheel cylindrical portion.

The worm housing portion is provided on a part in a circumferential direction of an outer-diameter side portion of the worm wheel housing portion.

The one or more reinforcing rib are provided on a front side surface of the front-side housing, extend in a direction in which an engagement reaction force acts between the worm wheel and a worm that is provided on the worm shaft, and span between the worm housing portion and the worm wheel bottom portion.

Note that as long as the one or more reinforcing ribs extending in the direction in which the engagement reaction force acts are provided on the front side surface of the front-side housing so as to span between the worm housing portion and the worm wheel bottom portion, the gear housing for an electric power steering device of the present invention may also include a rib (thick portion) having a larger thickness dimension than surrounding portions at any other location on the front side of the front-side housing; for example, at a portion on the opposite side in the diameter direction from the portion where the one or more reinforcing ribs are located, or the like.

The gear housing for an electric power steering device may further include mounting stays that protrude toward the front from the worm wheel bottom portion and are for supporting the front-side housing to a vehicle body. In this case, at least one reinforcing rib of the one or more reinforcing ribs may be continuous with the mounting stay.

The worm wheel bottom portion may include: a bearing holding hole at a central portion in the radial direction, and an annular protruding portion provided on an opening edge portion of the bearing holding hole and protruding further toward the front than an intermediate portion and outside portion in the radial direction of the worm wheel bottom portion. In this case, a front-side surface of at least one reinforcing rib of the one or more reinforcing ribs may be arranged at the same position as a front side surface of the annular protruding portion or further toward the rear than the front side surface of the annular protruding portion. Alternatively or additionally, at least one reinforcing rib of the one or more reinforcing ribs may span between a portion of the annular protruding portion closest to the worm housing portion and the worm housing portion.

The front-side housing may further include at least one boss portion on the front-side surface that protrudes further toward the front than surrounding portions thereof.

The electric power steering device of the present invention includes: a worm reducer having a worm shaft that is rotated and driven by an electric motor, a worm that is provided at an intermediate portion of the worm shaft, and a worm wheel that engages with the worm; and a gear housing for housing the worm reducer inside. In the electric power steering device of the present invention, the gear housing is configured by the gear housing for an electric power steering device of the present invention.

In the manufacturing method for a gear housing for an electric power steering device of the present invention, the front-side housing is manufactured by casting or injection molding of a synthetic resin using a mold having a cavity. When manufacturing the front-side housing, material is allowed to flow in the cavity from a worm housing portion forming space side for forming the worm housing portion to a worm wheel housing portion forming space side for forming the worm wheel housing portion.

Effect of Invention

With the present invention configured as described above, in the front-side housing, it is possible to ensure the rigidity, as well as ensure moldability during manufacturing even when the thickness is reduced.

MODES FOR CARRYING OUT THE INVENTION

First Example

Figure 13:
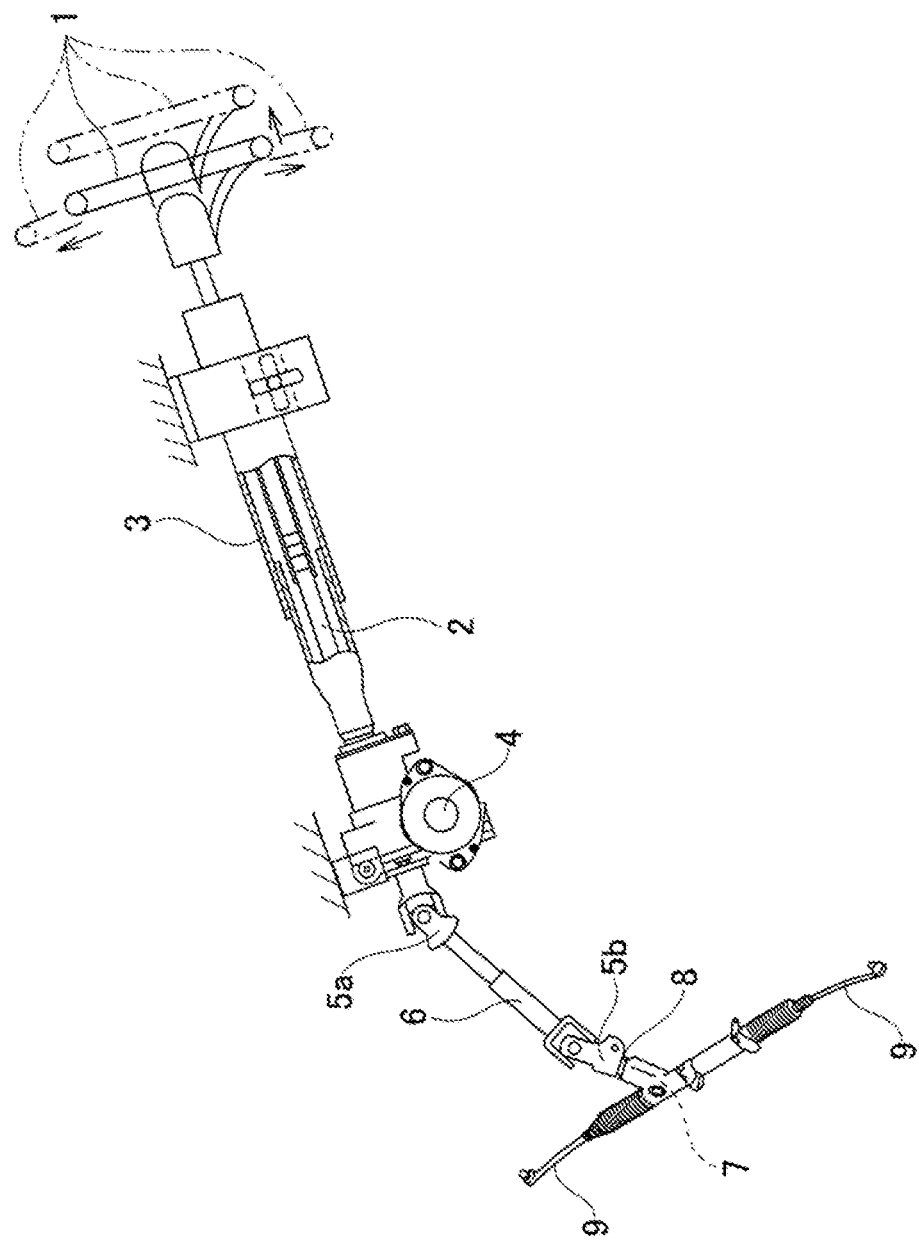
FIG. 13 is a partial cross-sectional view illustrating an example of an electric power steering device having a conventional structure.
Figure 14:
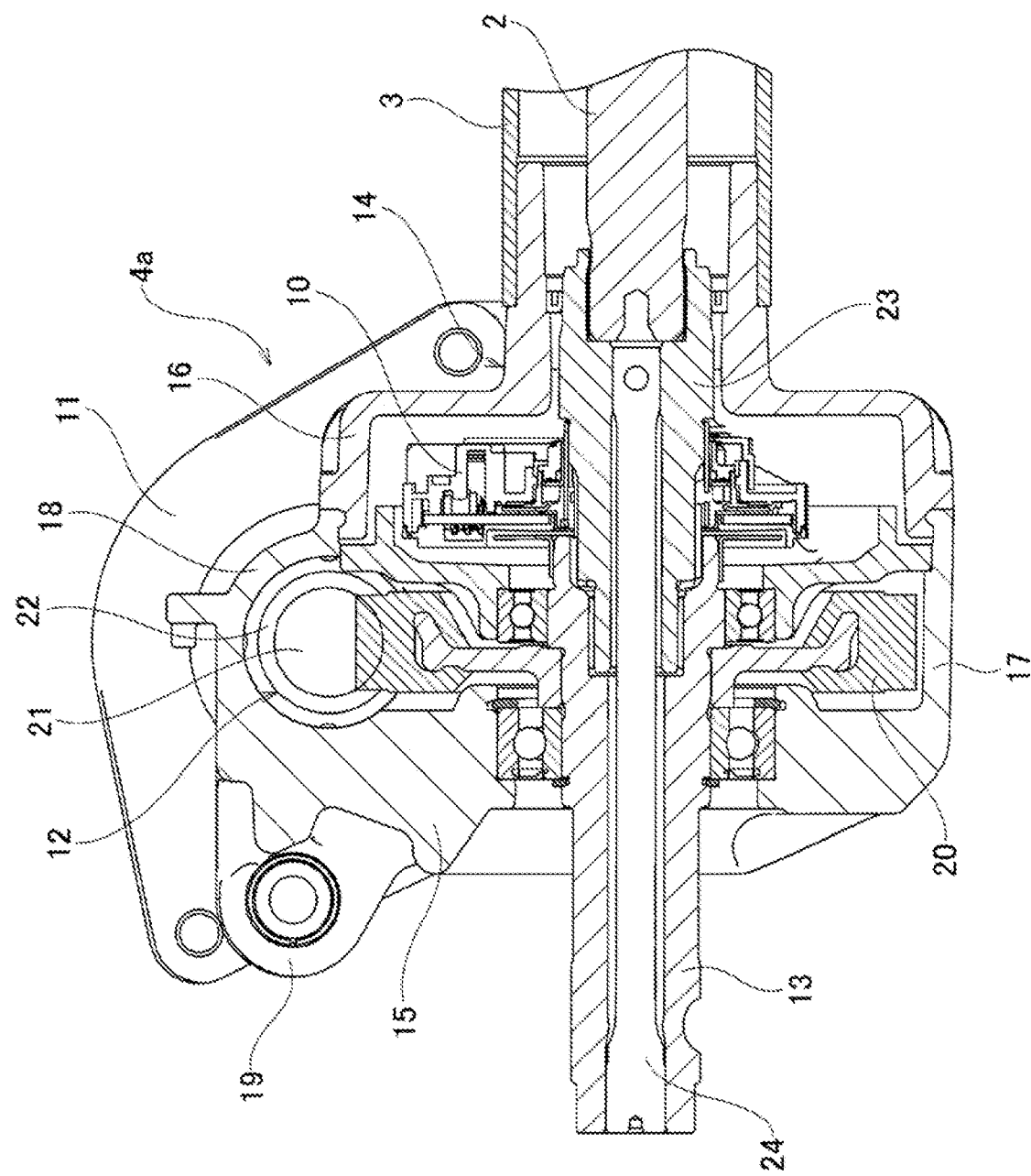
FIG. 14 is a cross-sectional view corresponding to FIG. 3 of an electric power assist device having a conventional structure.

A first example of an embodiment of the present invention will be described using FIG. 1 to FIG. 6. The electric power steering device according to this example includes a tilt-telescopic mechanism that allows the vertical position and the front-rear position of the steering wheel 1 (see FIG. 13) to be adjusted according to the physique and driving posture of the driver, and an electric power assist device 4b for reducing the force required for operating the steering wheel 1.

A steering shaft 2a is rotatably supported inside a steering column 3a via a plurality of rolling bearings (not illustrated). A steering wheel 1 is fixed to the rear end portion of the steering shaft 2a that protrudes toward the rear from the rear end opening of the steering column 3a. The steering shaft 2a includes an inner shaft 25 and an outer shaft 26 that are combined by a spline joint or the like so as to be able to transmit a rotational force and so as to be relatively displaceable in an axial direction. The inner shaft 25 and the outer shaft 26 have a function of being relatively displaced in the axial direction to enable adjustment of the front-rear position of the steering wheel 1 and a function of reducing the overall length of the steering shaft 2a in the event of a collision accident.

The steering column 3a has a hollow cylindrical shape as a whole and includes an inner column 27 and an outer column 28, and has a structure in which, a front-side portion of the outer column 28 is loosely fitted to a rear-side portion of the inner column 27 so that relative displacement in the axial direction is possible. The steering column 3a has a function of enabling adjustment of the front-rear position of the steering wheel 1, and a function of reducing the overall length of the steering column 3a together with the steering shaft 2a when a collision accident occurs. A gear housing 14a that includes an electric power assist device 4b is fixed to a front end portion (the left end portion in FIG. 1) of the inner column 27. The gear housing 14a is supported by a lower bracket 29 fixed to the vehicle body so as to be able to pivot about a tilt shaft 30 that is arranged in the width direction. Note that the width direction refers to the width direction of the vehicle body in which the electric power steering device is assembled, and corresponds to the left-right direction.

The outer column 28 is supported by the vehicle body by an upper bracket 31. The upper bracket 31 is configured to be detachable from the vehicle body in the forward direction when a strong forward impact is applied. The outer column 28 is supported by the upper bracket 31 so as to be able to move in the front-rear direction and the vertical direction, making it possible to adjust the front-rear position and the vertical position of the steering wheel 1. In order for this, a pair of sandwiched portions 32 of the outer column 28 includes telescopic-adjustment long holes 33 that extend in the front-rear direction. Moreover, a pair of support plate portions 34 of the upper bracket 31 is arranged on both sides in the width direction of the pair of sandwiched portions 32, and is provided with tilt-adjustment long holes 35 that extend in the vertical direction. An adjustment rod 36 is inserted in the width direction through the telescopic-adjustment long holes 33 and the tilt-adjustment long holes 35. By operating a lever (not illustrated) that is fixed to the end portion of the adjustment rod 36 for expanding or contracting an expanding/contracting device arranged around the adjustment rod 36 in the width direction, it is possible to adjust the force for clamping the pair of sandwiched portions 32 from both sides in the width direction by the pair of support plate portions 34. Accordingly, the outer column 28 may be fixed to the upper bracket 31, or that fixed state may be released.

When the fixed state is released, the front and rear position of the steering wheel 1 may be adjusted by moving the outer column 28 back and forth within a range in which the adjustment rod 36 may be displaced inside the telescopic-adjustment long holes 33. In addition, the vertical position of the steering wheel 1 may be adjusted by moving the steering column 3a up and down within a range in which the adjustment rod 36 may be displaced inside the tilt-adjustment long holes 35. At this time, the steering column 3a pivots and displaces in the vertical direction about the tilt shaft 30.

The electric power assist device 4b for reducing the operating force of the steering wheel 1 is arranged in the front of the steering column 3a, and includes a torque sensor 10a, an electric motor 11a, a worm reducer 12a, an output shaft 13a, and a gear housing 14a.

The worm reducer 12a includes a worm shaft 21a that is rotated and driven by the electric motor 11a, a worm 22a provided at an intermediate portion of the worm shaft 21a, and a worm wheel 20a that engages with the worm 22a.

The gear housing 14a includes a front-side housing 15a and a rear-side housing 16a that are combined in the front-rear direction via an intermediate plate 37, and houses the worm reducer 12a inside thereof. Each of the front-side housing 15a and the rear-side housing 16a is a part formed by casting (including die cast parts) of a light alloy such as an iron alloy or an aluminum alloy, or a part formed by injection molding of a synthetic resin.

The front-side housing 15a has a worm wheel housing portion 17a that houses the worm wheel 20a inside thereof, a worm housing portion 18a that houses the worm shaft 21a inside thereof, and a plurality (three in the illustrated example) of reinforcing ribs 38a, 38b. 38c.

The worm wheel housing portion 17a has a cup shape that is open in the rear and a center axis that extends in a substantially horizontal direction. The worm wheel housing portion 17a has a cylindrical worm wheel cylindrical portion 39 that is arranged around the worm wheel 20a, and a ring-shaped worm wheel bottom portion 40 that is arranged at the front of the worm wheel 20a and that is bent at a substantially right angle inward in the radial direction from the front end portion of the worm wheel cylindrical portion 39.

The worm wheel bottom portion 40 includes a substantially cylindrical inner-diameter-side cylindrical portion 41 on an inner peripheral edge portion. The worm wheel bottom portion 40 includes a bearing holding hole 42 in a portion on the inside in the radial direction of the inner-diameter-side cylindrical portion 41, which is a central portion in the radial direction. In addition, the worm wheel bottom portion 40 includes an annular protruding portion 43 that is provided at the opening edge on the front side of the bearing holding hole 42, and that protrudes further toward the front than an intermediate portion and outside portion in the radial direction of the worm wheel bottom portion 40. The annular protruding portion 43 is configured by the front end portion of the inner-diameter-side cylindrical portion 41.

The worm housing portion 18a has a substantially cylindrical shape with a bottom. The worm housing portion 18a is arranged in a part in the circumferential direction of a portion on the outer-diameter side of the worm wheel housing portion 17a, and in a portion that is located below in the assembled state of the electric power steering device. The internal space of the worm housing portion 18a communicates with the internal space of the worm wheel housing portion 17a. The worm housing portion 18a extends in a substantially horizontal direction, however, has a center axis that is in a skew-line relationship with the center axis of the worm wheel housing portion 17a. The worm housing portion 18a includes a motor mounting flange 44 that is provided on the end portion on the opening side, and that protrudes outward in the radial direction The gear housing 14a of the present example includes a pair of mounting stays 19a that protrudes toward the front from an intermediate portion in the vertical direction of the front side surface of the worm wheel bottom portion 40, and that are for supporting the gear housing 14a on the vehicle body via the lower bracket 29 so that the gear housing 14a may pivotally displace. More specifically, the pair of mounting stays 19a is spaced apart from each other at positions on the worm wheel bottom portion 40 of the front-side housing 15a that sandwich the bearing holding hole 42 from both sides in the width direction of the vehicle body. Each of the pair of mounting stays 19a has a mounting hole 45 at the tip end portion thereof, which penetrates in the width direction and through which the tilt shaft 30 is inserted. The tip-end half of the mounting stay 19a has a tapered shape in which the dimension in the vertical direction becomes smaller going toward the tip-end side, while the dimension in the vertical direction of the base-end half of the mounting stay 19a does not change; however, the dimension in the width direction increases going toward the base-end side (protrudes inward in the width direction). Moreover, the outside surface in the width direction of the base-end portion of the mounting stay 19a is continuous with the outer-circumferential surface of the worm wheel cylindrical portion 39, while the inside surface in the width direction of the base-end portion of the mounting stay 19a is continuous with annular protruding portion 43. Furthermore, the lower end portion of the outside surface in the width direction of the mounting stay 19a located on the opening side (the left side in FIG. 2 and FIG. 5) of the worm housing portion 18a in the width direction is continuous with the upper end portion of the inside surface in the width direction of the motor mounting flange 44. The pair of mounting stays 19a is arranged between a pair of side plate portions 46 of the lower bracket 29.

Each of the three reinforcing ribs 38a, 38b, 38c is solid and has a thickness dimension in the front-rear direction that is larger than portions existing around the ribs, and is arranged on the front-side surface of the front-side housing 15a so as to span between the worm housing portion 18a and the worm wheel bottom portion 40. More specifically, the thickness dimension of the front-side housing 15a at a portion where the reinforcing ribs 38a, 38b, 38c are installed is set to be sufficiently large within a range of, for example, 10 times or less that of the thickness dimension at portions of the front-side housing 15a existing around the reinforcing ribs 38a, 38b, 38c. However, preferably the thickness dimension of the front-side housing 15a at a portion where the reinforcing ribs 38a, 38b, 38c are installed may be set so that the reinforcing ribs 38a, 38b, 38c do not protrude in the axial direction from the annular protruding portion 43.

Figure 1:
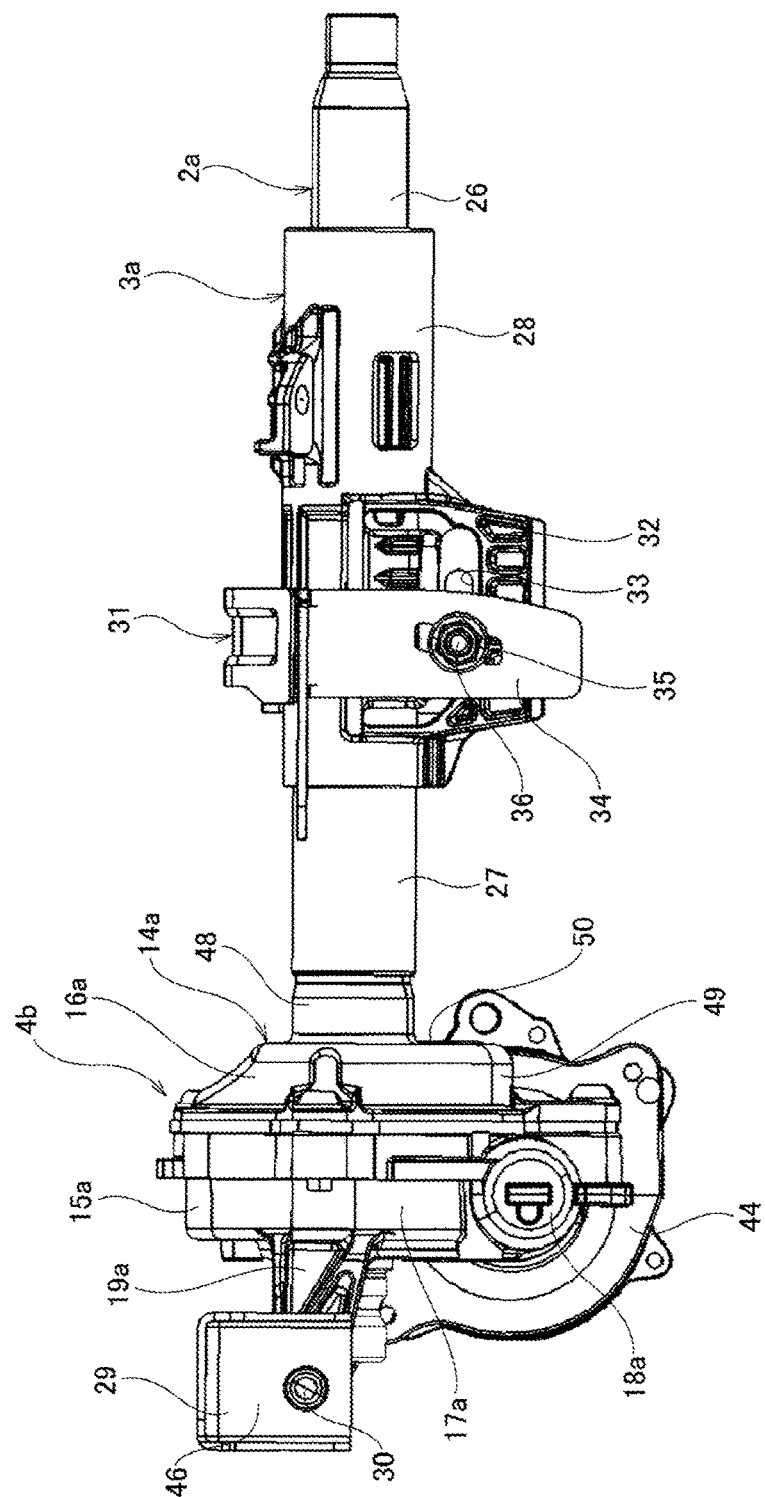
FIG. 1 is a side view of an electric power steering device of a first example of an embodiment of the present invention.
Figure 2:
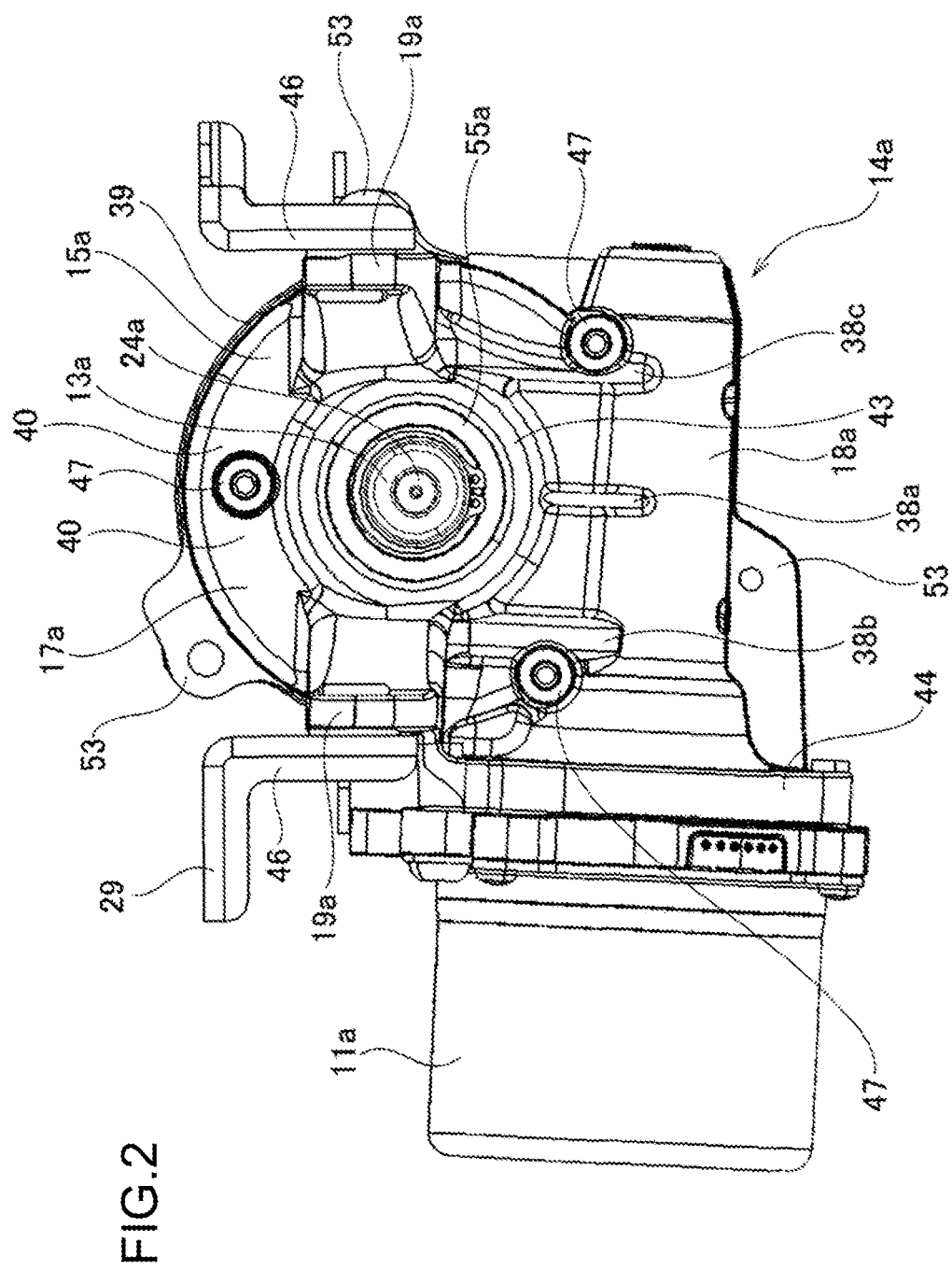
FIG. 2 is a diagram of the electric power steering device of the first example as seen from the front side.
Figure 3:
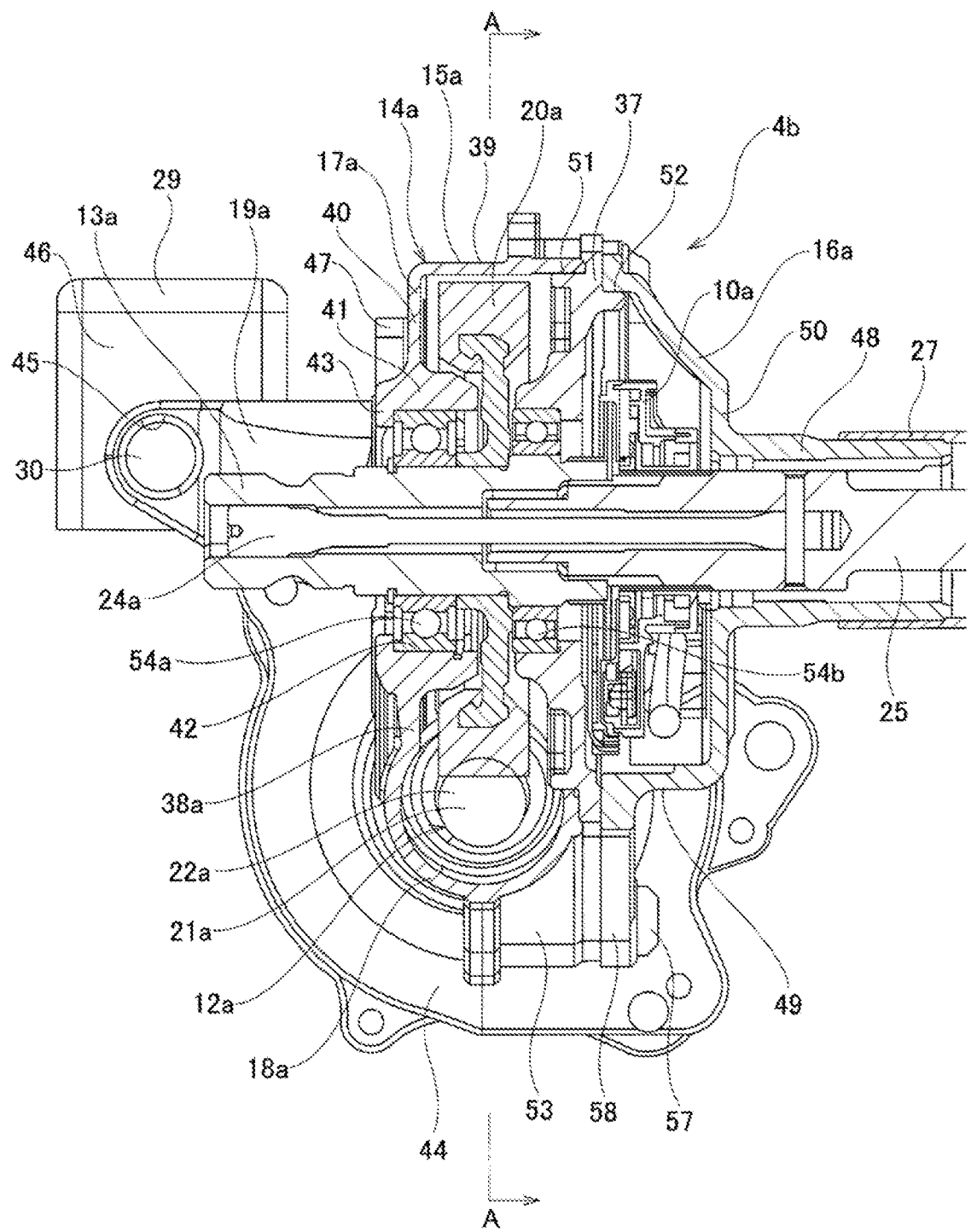
FIG. 3 is a cross-sectional view of a main part of the electric power steering device of the first example.
Figure 4:
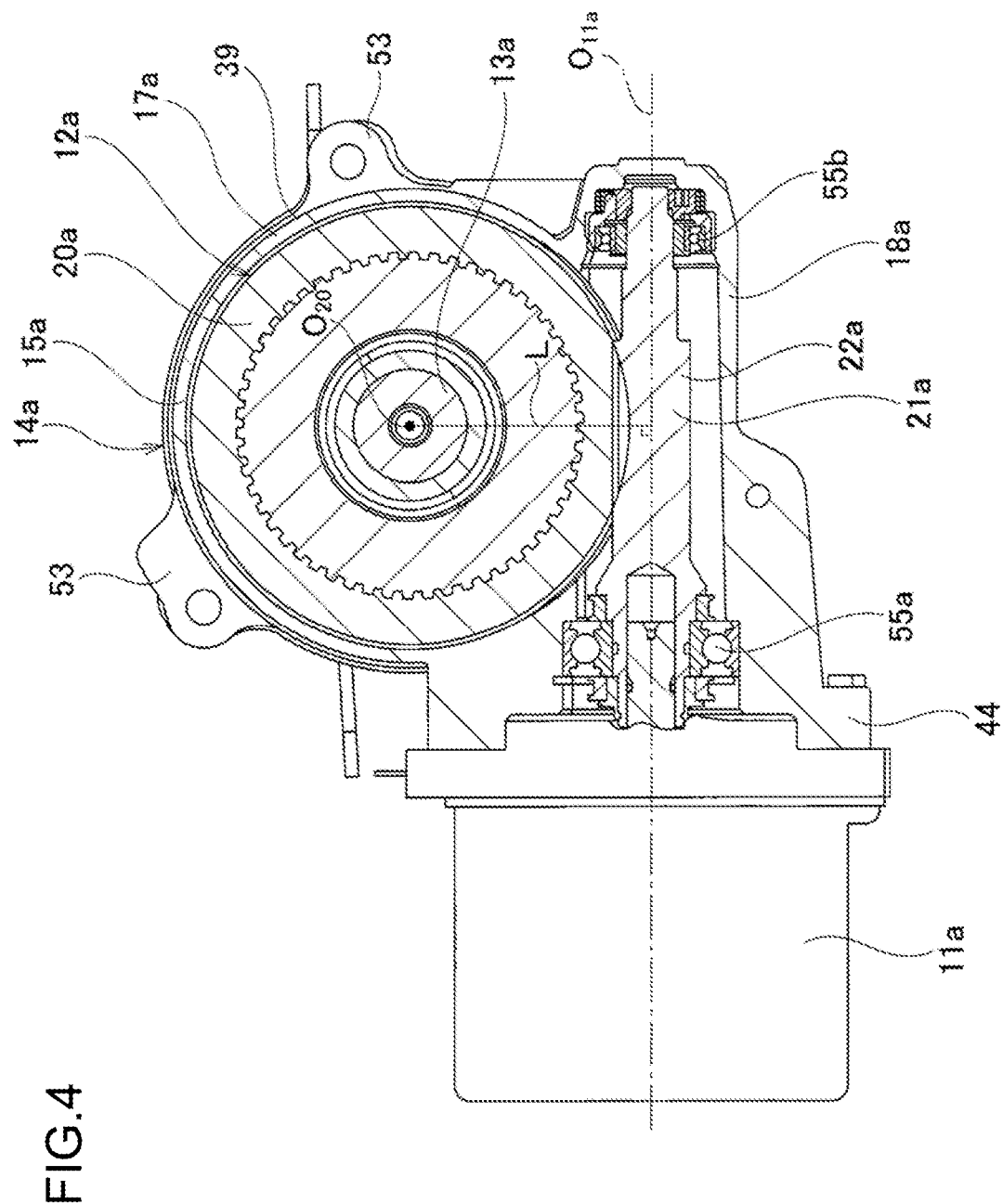
FIG. 4 is a cross-sectional view of section A-A in FIG. 3.
Figure 5:
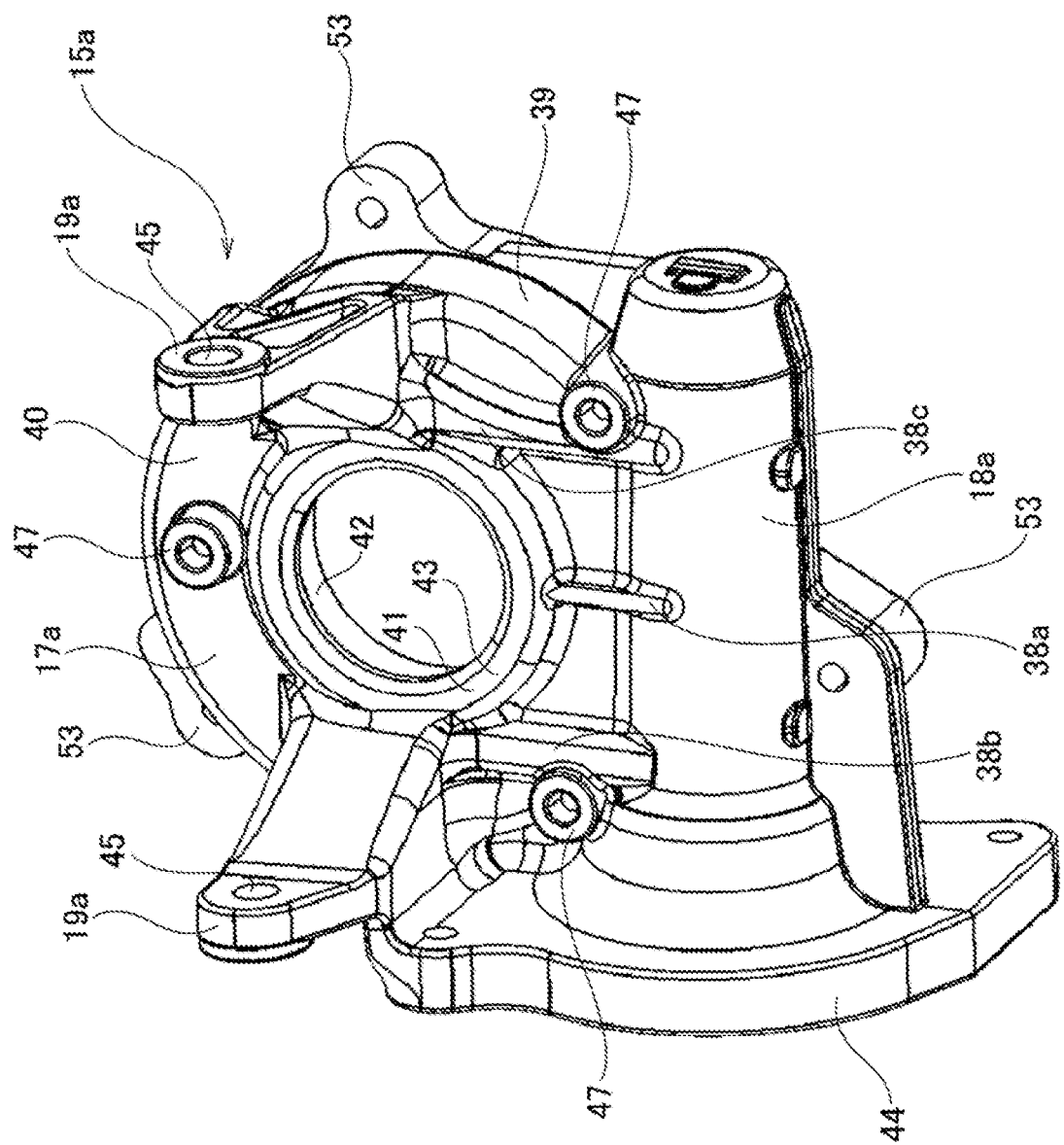
FIG. 5 is a perspective view illustrating a front-side housing that has been removed from the electric power steering device of the first example.

In this example, the reinforcing ribs 38a, 38b, 38c extend in the direction in which the engagement reaction force acts between the worm wheel 20a and the worm 22a provided on the worm shaft 21 and that corresponds with the arrangement direction of the worm wheel housing portion 17a and the worm housing portion 18a (vertical direction in FIG. 2 and FIG. 4). In other words, the reinforcing ribs 38a, 38b, 38c are arranged substantially parallel to a virtual straight line L that is orthogonal to the center axis $O_{20}$ of the worm wheel 20a and the center axis $O_{11a}$ of the electric motor 11a. Note that the term "substantially parallel" includes a case where the formation direction of the reinforcing ribs 38a, 38b, 38c is inclined with respect to the virtual straight line L due to a manufacturing error or assembly error of the electric power steering device. Note that, as will be described later, the extending direction of the reinforcing ribs 38a, 38b, 38c may be inclined with respect to the virtual straight line L as long as the rigidity of the front-side housing 15a against the engagement reaction force between the worm wheel 20a and the worm 22a may be improved. More specifically, the angle between the extending direction of the reinforcing ribs 38a, 38b, 38c and the virtual straight line L may be set to any angle of 45 degrees or less; however, preferably the angle is 0 degrees, or in other words, the formation direction of the reinforcing ribs 38a, 38b, 38c is parallel to the virtual straight line L. Moreover, the angle formed by the extending direction of the reinforcing rib 38a and the virtual straight line L may be 0 degrees, and the angle formed by the extending direction of the reinforcing ribs 38b and 38c and the virtual straight line L may be an arbitrary angle of 45 degrees or less.

The engagement reaction force is a force acting in opposite directions so as to separate the worm wheel 20a and the worm shaft 21 from each other. In this example, since the reinforcing ribs 38a, 38b, 38c extend in the direction in which the engagement reaction force acts, the rigidity of the front-side housing 15a with respect to the engagement reaction force may be effectively improved. Therefore, even in a case of reducing the thickness of the front-side housing 15a, harmful deformation or the like due to the engagement reaction force is prevented from occurring in the front-side housing 15a.

The reinforcing ribs 38a, 38b, 38c have a cross-sectional shape such as a trapezoidal shape or a convex arc shape in which the dimension in the width direction (transverse direction) decreases going toward the front. By giving a draft angle to each of the side surfaces in the width direction of the reinforcing ribs 38a, 38b, 38c, the releasability from the casting mold or the injection mold is ensured. The front side surfaces of the reinforcing ribs 38a, 38b, 38c are arranged at the same position as the front-side surface of the annular protruding portion 43, or is arranged further toward the rear than the front-side surface of the annular protruding portion 43. This prevents the layout characteristics of other members that are arranged in front of the front-side housing 15a from being deteriorated due to the reinforcing ribs 38a, 38b, 38c.

Of the reinforcing ribs 38a, 38b, 38c, the reinforcing rib 38a installed at an intermediate portion in the width direction is arranged so as to span between the lower end portion of the annular protruding portion 43 that is closest to the worm housing portion 18a and the intermediate portion in the axial direction of the worm housing portion 18a. Therefore, the upper end portion of the reinforcing rib 38a is connected to the lower end portion of the annular protruding portion 43. On the other hand, the two reinforcing ribs 38b, 38c that are installed on both sides in the width direction are arranged so as to span between the lower surfaces of the base-end portions of the pair of mounting stays 19a and both side portions in the axial direction of the worm housing portion 18a. Therefore, the upper end portions of the reinforcing ribs 38b, 38c are connected to the lower surfaces of the base-end portions of the mounting stays 19a. In other words, the reinforcing ribs 38b, 38c and the pair of mounting stays 19a are arranged so as to be continuous in the vertical direction.

The thickness dimension in the width direction (thickness dimension in the transverse direction) of the reinforcing rib 38a is substantially constant over the entire length, whereas the thickness dimension in the width direction of the reinforcing ribs 38b, 38c becomes larger going toward the mounting stays 19a.

In this example, the front-side housing 15a includes a plurality (three in the illustrated example) of boss portions 47 at a plurality of locations on the front side surface, and protrude further toward the front than surrounding portions thereof. More specifically, the boss portions 47, each having a cylindrical shape, and are arranged at the central portion of the upper end portion of the front side surface of the worm wheel bottom portion 40 and at two locations of the outer peripheral edge portion of the worm wheel housing portion 17a that is continuous with the worm housing portion 18a. The boss portions 47 protrude further toward the front than the surrounding portions thereof, and thereby the thickness is increased. Note that each of the two boss portions 47 that are arranged on the outer peripheral edge portions of the worm wheel housing portion 17a are continuous with the reinforcing ribs 38b, 38c. The boss portions 47 have a function of improving the efficiency of the operation of assembling the gear housing 14a by, for example, gripping the boss portions 47 with an assembling device or a jig when assembling the gear housing 14a around the worm reducer 12a.

Figure 6:
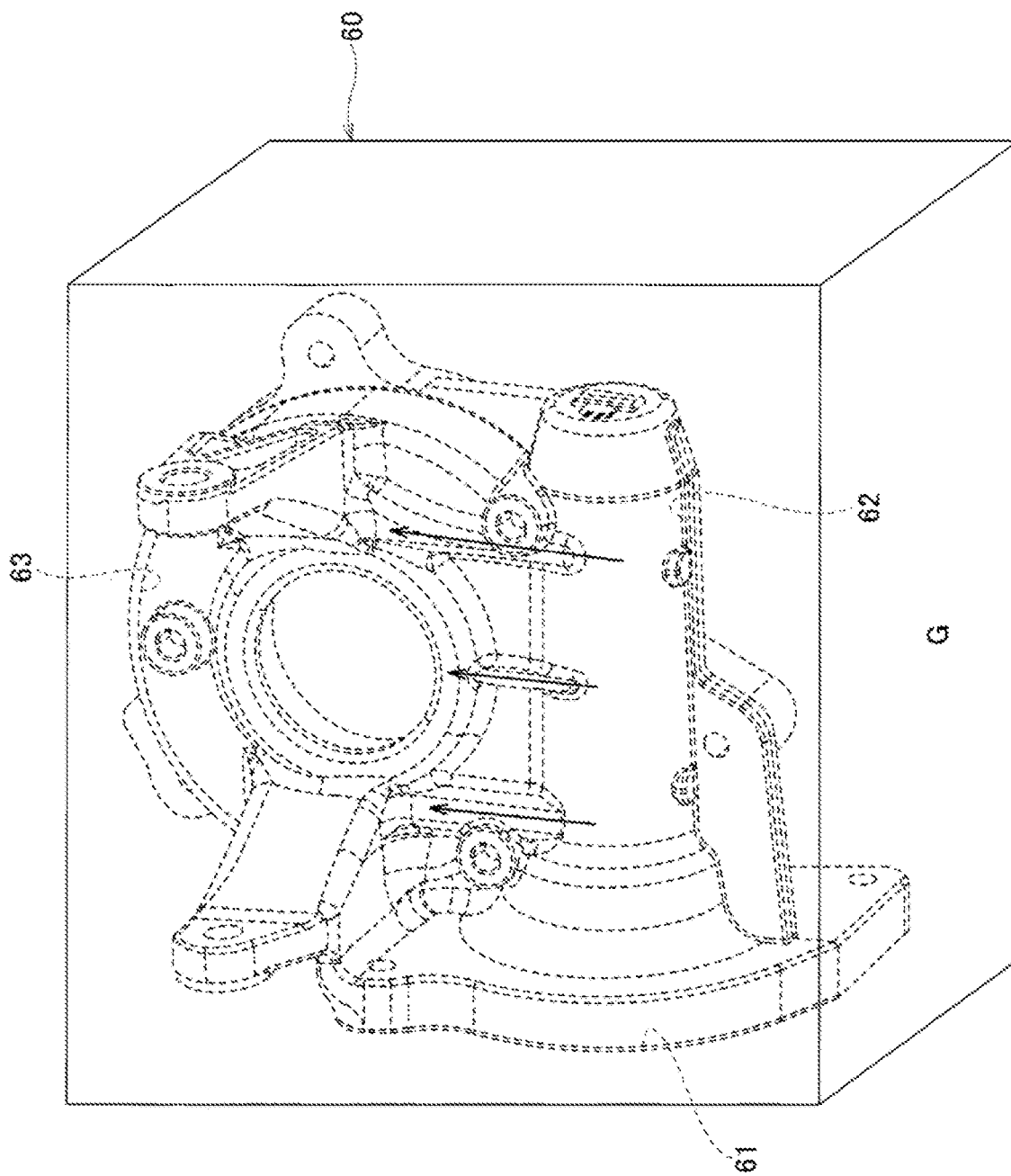
FIG. 6 is a schematic view of a mold and is for describing a process of manufacturing the front-side housing of the first example by casting or injection molding.
Figure 7:
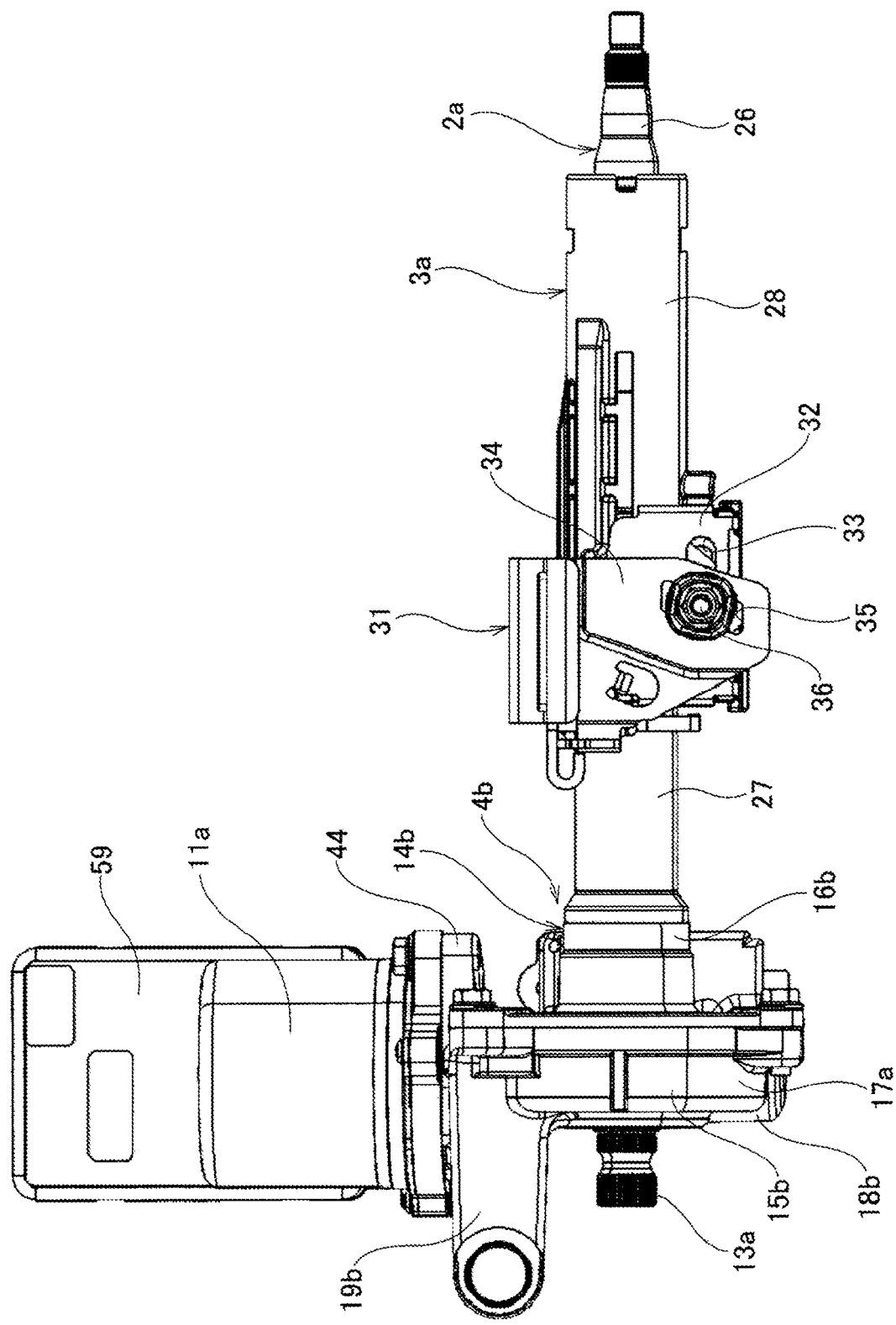
FIG. 7 is a side view of an electric power steering device of a second example of an embodiment of the present invention.
Figure 8:
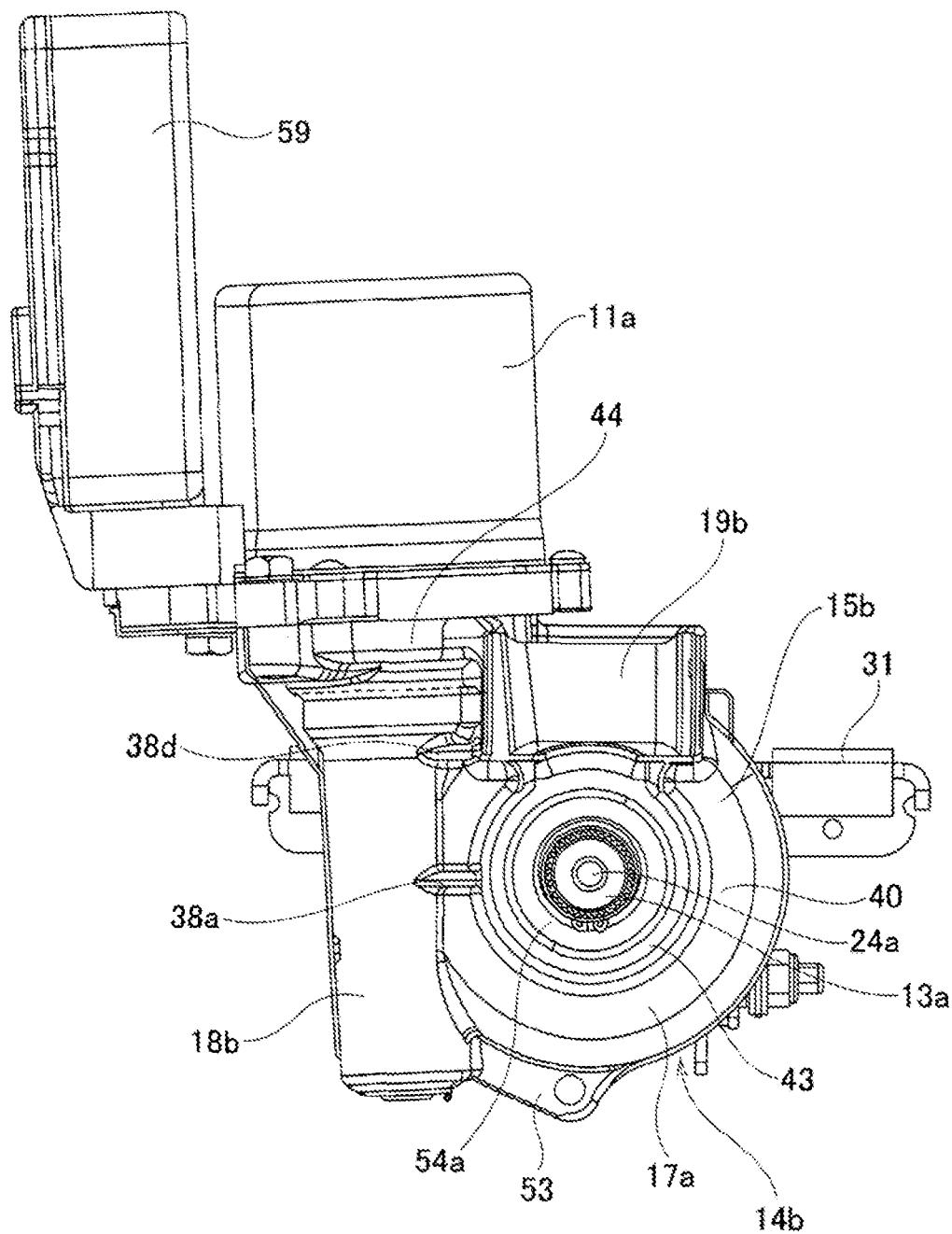
FIG. 8 is a diagram of the electric power steering device of the second example as seen from the front side.
Figure 9:
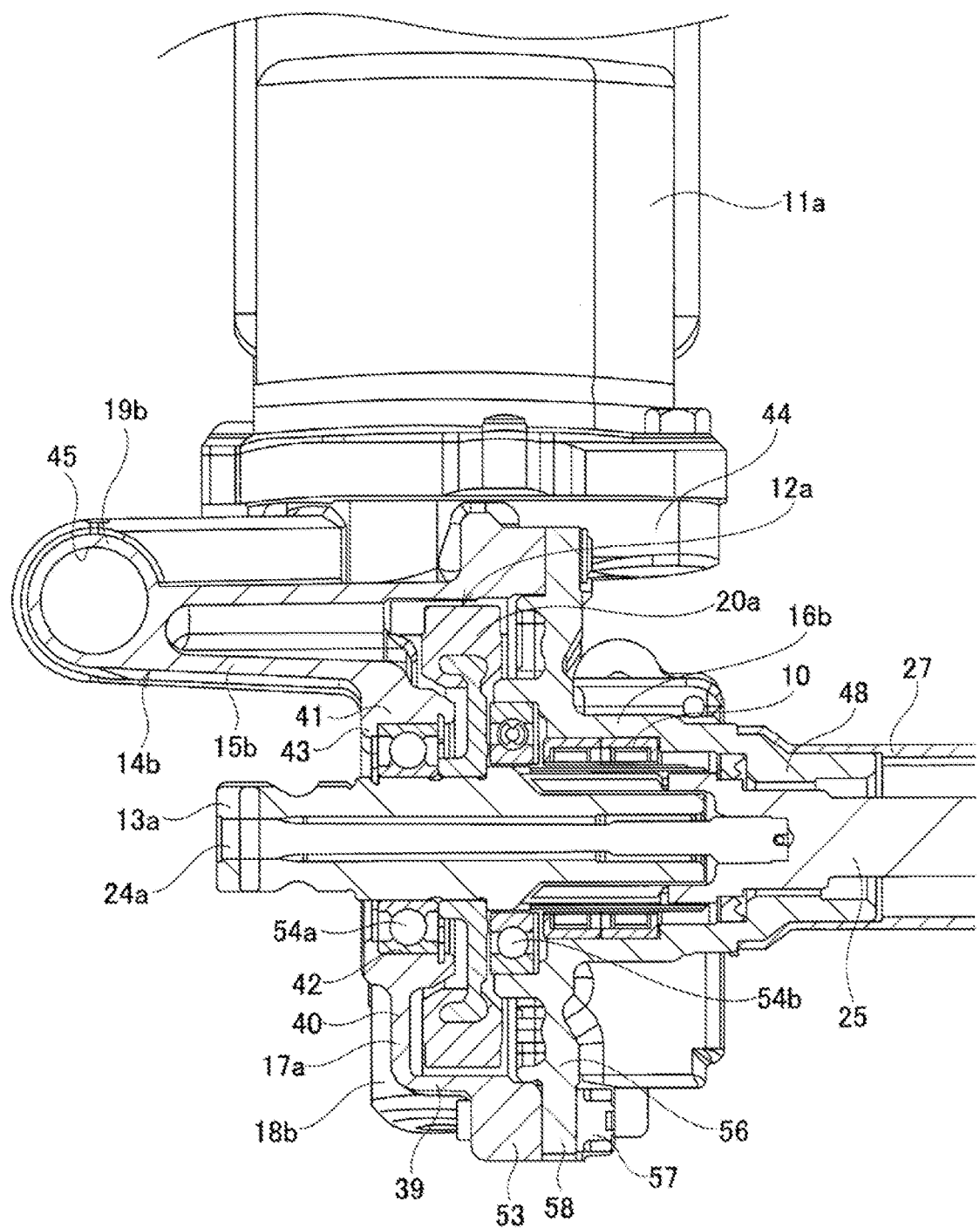
FIG. 9 is a cross-sectional view of a main part of the electric power steering device of the second example.
Figure 10:
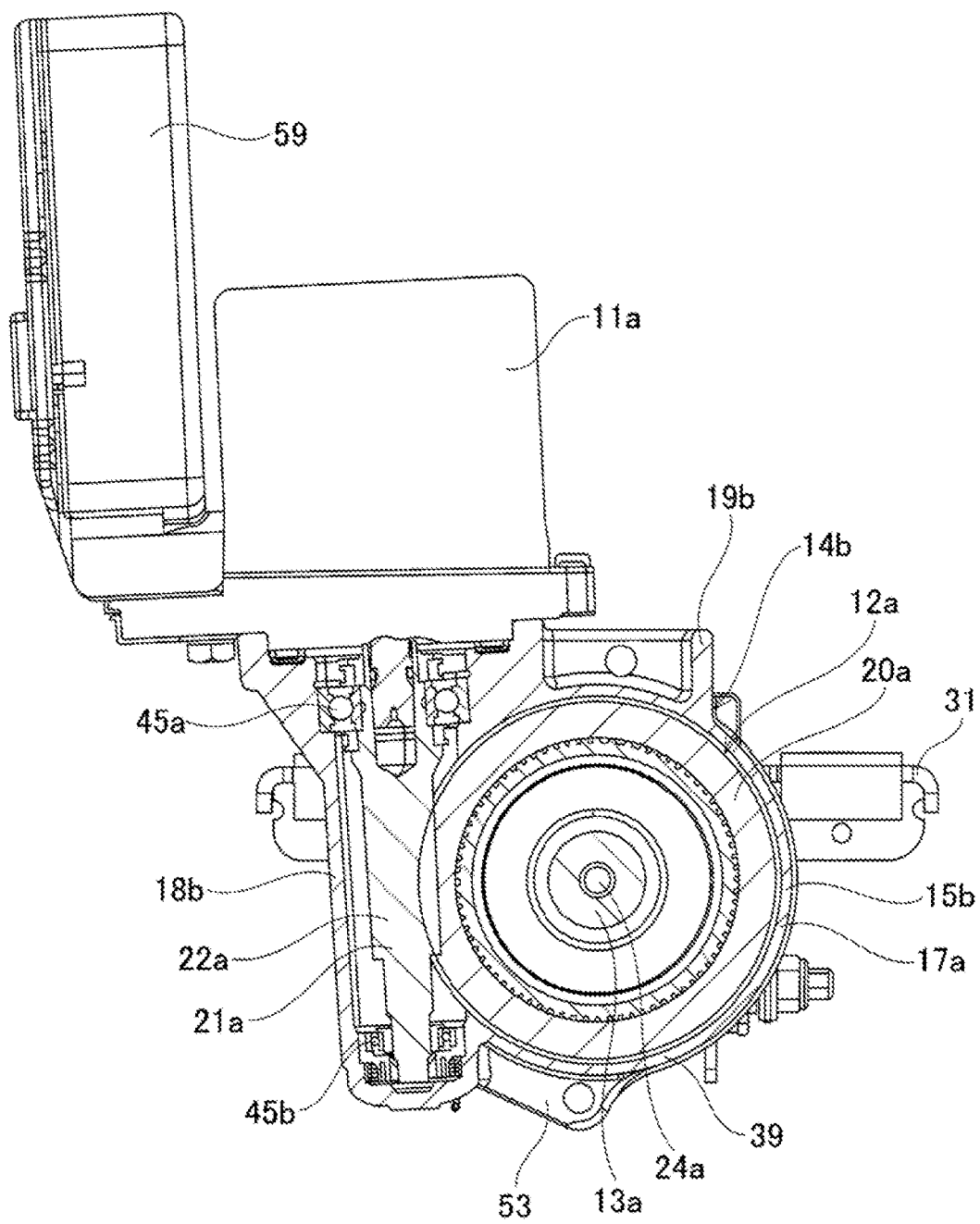
FIG. 10 is a cross-sectional view corresponding to FIG. 4 of the electric power steering device of the second example.
Figure 11:
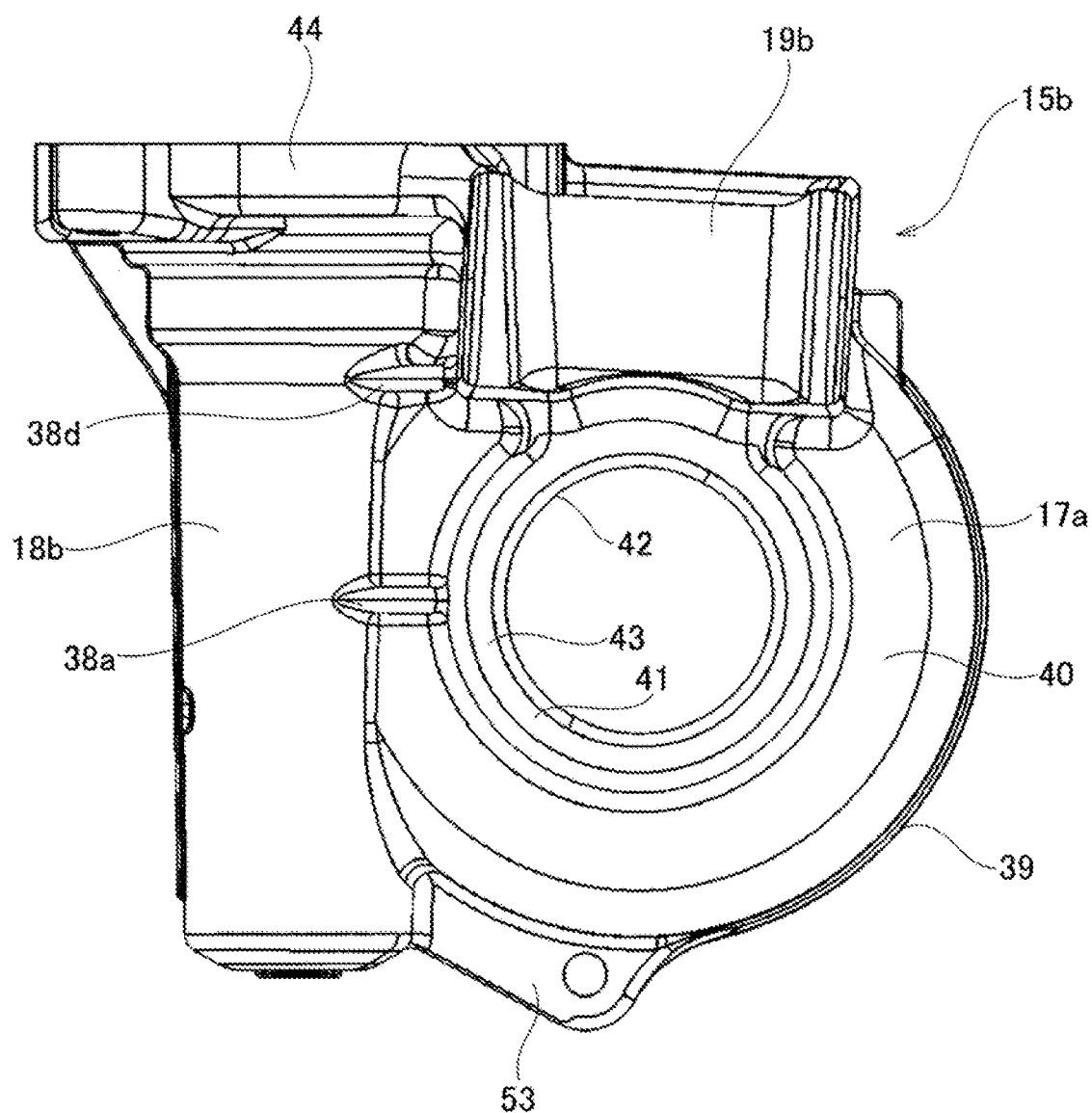
FIG. 11 is a front view illustrating a front-side housing that has been removed from the electric power steering device of the second example.
Figure 12:
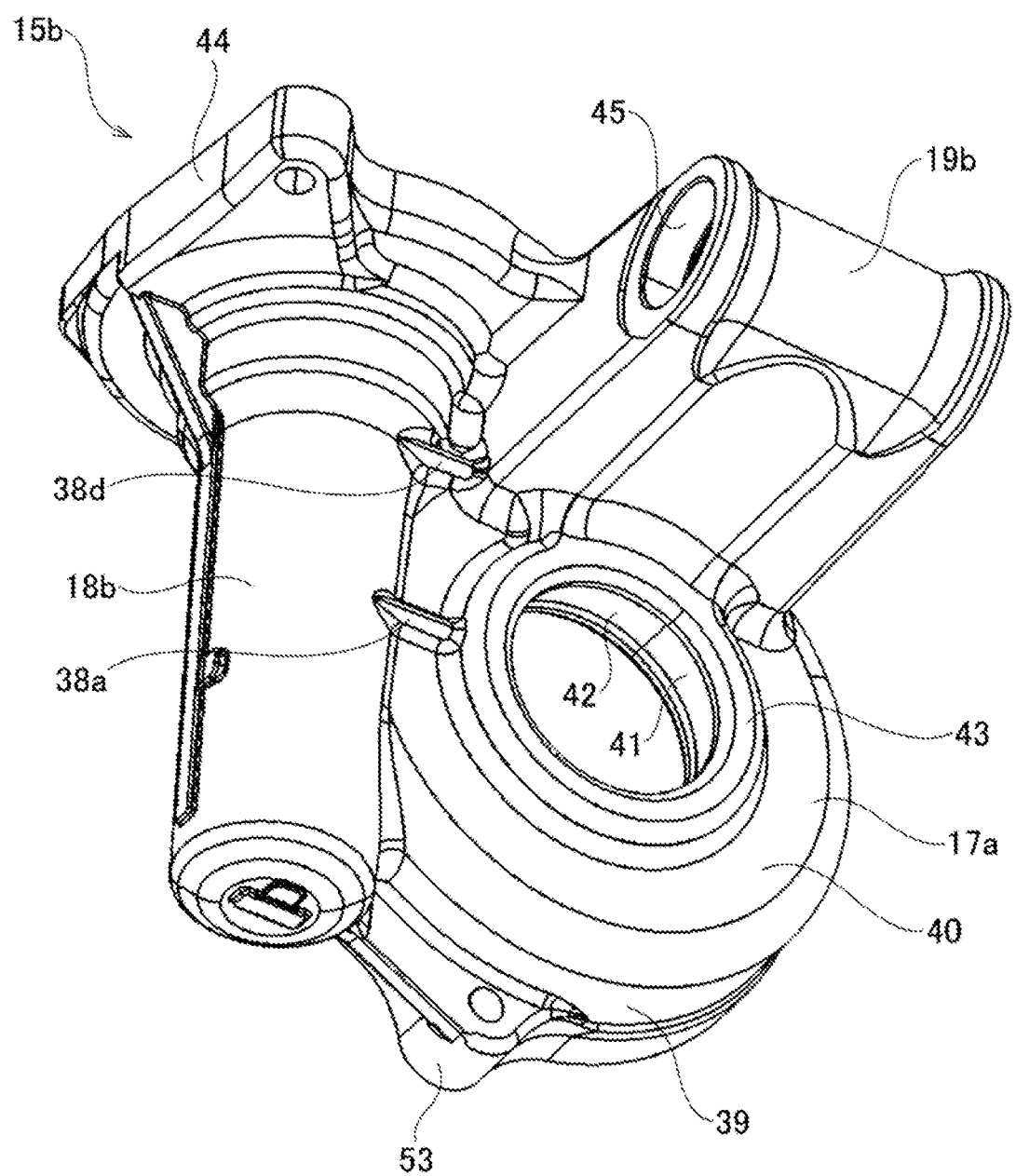
FIG. 12 is a perspective view illustrating the front-side housing that has been removed from the electric power steering device of the second example.

In this example, when the front-side housing 15a having the configuration described above is manufactured by casting or injection molding using a mold (casting die, injection molding die) 60 having a cavity 61, as illustrated in FIG. 6, the gate G of the mold 60 serving as a supply port of the material (melt, synthetic resin) is arranged in the cavity 61 for forming the front-side housing 15a on the opposite side of the worm wheel housing portion forming space 63 for forming the worm wheel housing portion 17a and with the worm housing portion forming space 62 for forming the worm housing portion 18a sandwiched in between. In other words, the gate G is arranged so that the worm housing portion forming space 62 is on the upstream side. As a result, the material that has passed through the worm housing portion forming space 62 flows toward the worm wheel housing portion forming space 63. Therefore, in the front-side housing 15a of this example, the worm housing portion 18a is located further on the upstream side in the material flow direction than the worm wheel housing portion 17a.

On the other hand, the rear-side housing 16a is formed of a casted or a synthetic resin injection molded product having a hollow cylindrical shape as a whole, and includes a fixed cylindrical portion 48, a large-diameter cylindrical portion 49, and a continuous portion 50. The fixed cylindrical portion 48 has a cylindrical shape and is fitted and fixed inside the front end portion of the inner column 27. The large-diameter cylindrical portion 49 is arranged around the torque sensor 10a, and abuts on the rear end opening of the front-side housing 15a via the intermediate plate 37. The continuous portion 50 connects the front end portion of the fixed cylindrical portion 48 and the rear end portion of the large-diameter cylindrical portion 49.

In this example, the front-side housing 15a and the rear-side housing 16a are connected to each other by a plurality of (three in the illustrated example) bolts 57 in a state of being assembled via the intermediate plate 37. More specifically, the rear end portion of the front-side housing 15a (the worm wheel cylindrical portion 39) is externally fitted to a front-side fitting portion 51 that is provided on the outer diameter side portion of the front-side surface of the intermediate plate 37 which is formed in a substantially ring shape as a whole, and the front end portion of the rear-side housing 16 (large-diameter cylindrical portion 49) fits externally with a rear-side fitting portion 52 that is provided on the outer diameter side portion of the rear side surface of the intermediate plate 37. In this state, a plurality (three in the illustrated example) of front-side coupling flanges 53 formed on the outer peripheral surface of the worm wheel cylindrical portion 39 constituting the front-side housing 15a and a plurality (three in the illustrated example) of rear-side coupling flanges 58 formed on the outer peripheral surface of the large-diameter cylindrical portion 49 of the rear-side housing 16a are coupled to each other by bolts 57.

In this example, the output shaft 13a is rotatably supported by a pair of rolling bearings 54a, 54b inside the gear housing 14a having the configuration described above. Of the pair of rolling bearings 54a, 54b, the front-side rolling bearing 54a is internally fitted and held inside the bearing holding hole 42 of the front-side housing 15a, and the rear rolling bearing 54b is internally fitted and held inside the inner peripheral surface of the intermediate plate 37. In addition, the outer ring of the front-side rolling bearing 54a is internally fitted and fixed in the intermediate portion in the axial direction of the inner peripheral surface of the bearing holding hole 42 by press fitting. Furthermore, the outer ring of the front-side rolling bearing 54a is sandwiched from both sides by a step surface provided at a portion near the front end of the bearing holding hole 42 and facing toward the rear and a retaining ring that is locked in a locking groove formed in a portion near the rear end of the inner peripheral surface of the bearing holding hole 42. The output shaft 13a is connected to a front end portion of an inner shaft 25 of the steering shaft 2a via the torsion bar 24a. Moreover, the universal joint 5a (see FIG. 13) is coupled with a portion of the front end portion of the output shaft 13a that protrudes outside the gear housing 14a.

The worm wheel 20a of the worm reducer 12a is externally fitted and fixed to an intermediate portion of the output shaft 13a between the pair of rolling bearings 54a, 54b. In this state, the worm wheel 20a is arranged inside the worm wheel housing portion 17a of the front-side housing 15a.

The worm shaft 21a of the worm reducer 12a is rotatably supported inside the worm housing portion 18a via the pair of rolling bearings 55a, 55b. In this state, the worm 22a that is provided on the intermediate portion of the worm shaft 21a engages with the worm wheel 20a. The output shaft of the electric motor 11a is connected to the base-end portion of the worm shaft 21a. Accordingly, the auxiliary power of the electric motor 11a may be transmitted to the worm wheel 20a The electric motor 11a is supported by and fixed to the gear housing 14a via the motor mounting flange 44 of the front-side housing 15a. Note that, in the present example, by providing a preload applying mechanism 64 between the rolling bearing 55a that is externally fitted to the tip-end portion of the worm shaft 21a and the inner peripheral surface of the worm housing portion 18a that elastically biases the tip-end portion of the worm shaft 21a toward the worm wheel 20a, backlash existing at the engaging portion between the worm wheel 20a and the worm 22a is suppressed.

The torque sensor 10a is arranged around the front end portion of the inner shaft 25 inside the large-diameter cylindrical portion 49 of the rear-side housing 16a. The electric motor 11a rotates and drives the worm shaft 21a in accordance with the direction and magnitude of the steering torque applied from the steering wheel 1 to the steering shaft 2a detected by the torque sensor 10a, and outputs auxiliary power (auxiliary torque) to the output shaft 13a. As a result, the operation force of the steering wheel 1 that is required when applying a steering angle to a pair of left and right steered wheels is reduced.

According to the electric power steering device of the present example having the configuration described above, the rigidity of the front-side housing 15a of the gear housing 14a may be ensured even when the thickness is reduced, and also the moldability at the time of manufacturing may be ensured. In other words, in this example, the reinforcing ribs 38a, 38b, 38c are arranged on the front side surface of the front-side housing 15a so as to span between the worm housing portion 18a and the worm wheel bottom portion 40, and the extending direction of the reinforcing ribs 38a, 38b, 38c is made to coincide with the direction in which the engagement reaction force acts between the worm wheel 20a and the worm 22a. Therefore, the rigidity of the front-side housing 15a with respect to the engagement reaction force may be effectively improved. Accordingly, even in a case where thickness of the front-side housing 15a is reduced, harmful deformation or the like due to the engagement reaction force is prevented from occurring in the front-side housing 15a.

In this example, the reinforcing ribs 38a, 38b, 38c are formed on the front-side housing 15a, so, in regard to the cavity 61 of the mold 60 used when manufacturing the front-side housing 15a by casting or injection molding, the cross-sectional area of the space through which the material flows may be increased by the amount of space for forming the reinforcing ribs 38a, 38b, 38c. Furthermore, the extending direction of the reinforcing ribs 38a, 38b, 38c is made to coincide with the direction in which the engagement reaction force acts, which is oriented in the direction in which the worm wheel housing portion 17a and the worm housing portion 18a are arranged, so, as illustrated by the arrows in FIG. 6, the material supplied from the gate G may be efficiently supplied to the worm wheel housing portion forming space 63 through the space in the cavity 61 for forming the reinforcing ribs 38a, 38b, 38c. As described above, according to the structure of the present example, the fluidity (flowability) of the material may be improved, and the moldability during manufacturing may be improved.

Moreover, since the two reinforcing ribs 38b, 38c are each formed so as to be continuous with the mounting stays 19a, the material may be directly supplied to the spaces for forming the mounting stays 19a through the spaces for forming the reinforcing ribs 38b, 38c. Therefore, the material may be sufficiently supplied to the spaces for forming the mounting stays 19a, and thus the strength and rigidity of the mounting stays 19a may be improved. In addition, the material may be directly supplied to the space for forming the inner-diameter-side cylindrical portion 41, particularly to the portion for forming the annular protruding portion 43 in this space, through the space for forming the reinforcing rib 38a. Therefore, according to this example, a deterioration of the quality of the front-side housing 15a is prevented. In other words, the occurrence of defective products is reduced. Moreover, the substantial strength of the front-side housing 15a may be improved. Furthermore, as described above, together with being able to ensure the rigidity, moldability during manufacturing may be ensured, and thus weight reduction by reducing the thickness may be achieved.

Moreover, by providing the reinforcing ribs 38a, 38b, 38c, the rigidity of the front-side housing 15a and the rigidity of the mounting stays 19a may be improved. For this reason, the operation feeling and operation efficiency of the electric power steering device may be improved, and the occurrence of vibration and abnormal noise may be suppressed. In addition, the rigidity of the mounting stays 19a may be improved, so the behavior of the contraction operation of the steering shaft 2a and the steering column 3a may be stabilized, and the collision energy absorption characteristics may be improved. Note that, in this example, the front-side housing 15a includes the three reinforcing ribs 38a, 38b, 38c; however, even in a case where only one reinforcing rib is provided, the operation and effects of the present invention may be achieved. The number, the installation positions, and the shape of the reinforcing ribs are arbitrarily and are appropriately selected from the aspect of the arrangement and shape of each part of the front-side housing, the flow of the material at the time of manufacturing of the front-side housing, and ensuring the rigidity of the front housing.

SECOND EXAMPLE

A second example of an embodiment of the present invention will be described with reference to FIG. 7 to FIG. 12. In this example, the structure of the front-side housing 15b is changed from the structure of the first example. In the front-side housing 15b of the present example, the worm housing portion 18b is arranged in a part in the circumferential direction of the outer diameter side portion of the worm wheel housing portion 17a, and in a state in which the electric power steering device is assembled, is arranged at a portion located on the side of the output shaft 13a in the width direction of the vehicle body. Therefore, the center axis of the worm housing portion 18b is oriented in the vertical direction. Moreover, the opening portion of the worm housing portion 18b faces upward in a state in which the electric power steering device is assembled. Furthermore, the worm wheel bottom portion 40 includes one mounting stay 19b having a shape in which the pair of mounting stays 19a illustrated in the first example are continuous in the width direction, at the upper end portion of the front side surface thereof. In this example, the outside surface in the width direction of the mounting stay 19b is continuous with the side surface in the width direction of the motor mounting flange 44 that is provided at the opening-side end portion of the worm housing portion 18b. In addition, the motor mounting flange 44 supports the electric motor 11a and the control device 59 including a built-in board.

In this example, in response to the change in the arrangement of the worm housing portion 18b and the change in the shape of the mounting stay 19b, the worm wheel bottom portion 40 has only two reinforcing ribs 38a, 38d on the front side surface. More specifically, the reinforcing rib 38a is arranged so as to span between the end portion of the annular protruding portion 43 closest to the worm housing portion 18b and an intermediate portion in the vertical direction of the worm housing portion 18b, and the reinforcing rib 38d is arranged so as to span between the outside surface in the width direction of the base-end portion of the mounting stay 19b and a portion near the upper end of the worm housing portion 18b. In this example, the mounting stay is not arranged in a portion corresponding to the lower end portion of the worm housing portion 18b, so only the two reinforcing ribs 38a, 38d are provided as described above. The reinforcing ribs 38a, 38d extend in the direction in which the engagement reaction force acts between the worm wheel 20a and the worm 22a.

The gear housing 14b is configured by directly assembling the front-side housing 15b and the rear-side housing 16b in the front-rear direction without an intermediate plate. The rear-side housing 16b includes a fixed cylindrical portion 48 that is fixed to the front end portion of the inner column 27, and a ring-shaped lid portion 56 that is bent outward in the radial direction from the front end of the fixed cylindrical portion 48. The lid portion 56 closes the rear end opening portion of the front-side housing 15b.

In the case of this example as well, the two reinforcing ribs 38a, 38d extend in the direction in which the engagement reaction force acts, so the rigidity of the front-side housing 15b with respect to the engagement reaction force may be effectively improved. Moreover, the material may be efficiently supplied to the space for forming the worm wheel housing portion 17a (particularly, the space for forming the mounting stay 19b) through the space for forming the reinforcing ribs 38a, 38d. Therefore, the rigidity of the front-side housing 15b of the gear housing 14b may be ensured even when the thickness is reduced, and the moldability during manufacturing may also be ensured. Other configurations and operational effects are the same as those of the first example.

REFERENCE SIGNS LIST

1 Steering wheel
2, 2a Steering shaft
3, 3a Steering column
4, 4a, 4b Electric power assist device
5a, 5b Universal joint
6 Intermediate shaft
7 Steering gear unit
8 Pinion shaft
9 Tie rod
10, 10a Torque sensor
11, 11a Electric motor
12, 12a Worm reducer
13, 13a Output shaft
14, 14a, 14b Gear housing
15, 15a, 15b Front-side housing
16, 16a Rear-side housing
17, 17a Worm wheel housing portion
18, 18a, 18b Worm housing portion
19, 19a, 19b Mounting stay
20, 20a Worm wheel
21, 21a Worm shaft
22, 22a Worm
23 Input shaft
24 Torsion bar
25 Inner shaft
26 Outer shaft
27 Inner column
28 Outer column
29 Lower bracket
30 Tilt shaft
31 Upper bracket
32 Sandwiched portion
33 Telescopic-adjustment long hole
34 Support plate portion
35 Tilt-adjustment long hole
36 Adjustment rod
37 Intermediate plate
38a, 38b, 38c, 38d Reinforcing rib
39 Worm wheel cylindrical portion
40 Worm wheel bottom portion
41 Inner-diameter-side cylindrical portion
42 Bearing holding hole
43 Annular protruding portion
44 Motor mounting flange
45 Mounting hole
46 Side plate portion
47 Boss portion
48 Fixed cylindrical portion
49 Large-diameter cylindrical portion
50 Continuous portion
51 Front-side fitting portion
52 Rear-side fitting portion
53 Front-side coupling flange
54a, 54b Rolling bearing
55a, 55b Rolling bearing
56 Lid portion
57 Bolt
58 Rear-side coupling flange
59 Control device
60 Mold
61 Cavity
62 Worm housing portion forming space
63 Worm wheel housing portion forming space

The invention claimed is:

1. A gear housing for an electric power steering device, comprising:
a front-side housing and a rear-side housing combined in a front-rear direction;
the front-side housing comprising: a worm wheel housing portion housing a worm wheel inside, a worm housing portion housing a worm shaft inside, and one or more reinforcing ribs;
the worm wheel housing portion having: a worm wheel cylindrical portion arranged around the worm wheel; and a disk shaped worm wheel bottom portion bent inward in a radial direction from a front end portion of the worm wheel cylindrical portion;
the worm housing portion provided on a part in a circumferential direction of an outer-diameter side portion of the worm wheel housing portion;
wherein
the reinforcing ribs are provided on a front side surface of the front-side housing, extending in a direction in which an engagement reaction force acts between the worm wheel and a worm that is provided on the worm shaft, and spanning between the worm housing portion and the worm wheel bottom portion,
a mounting stay protrudes toward a front side from the worm wheel bottom portion and is for supporting the front-side housing to a vehicle body, and
at least one reinforcing rib of the reinforcing ribs is continuous with the mounting stay.

2. The gear housing for an electric power steering device according to claim 1, wherein
the thickness dimension in the width direction of the at least one reinforcing rib becomes larger going toward the mounting stay.

3. The gear housing for an electric power steering device according to claim 1, wherein
the worm wheel bottom portion comprises: a bearing holding hole at a central portion in the radial direction, and an annular protruding portion provided on an opening edge portion of the bearing holding hole and protruding further toward a front side than an intermediate portion and an outside portion in the radial direction of the worm wheel bottom portion.

4. The gear housing for an electric power steering device according to claim 3, wherein
   a front-side surface of at least one reinforcing rib of the reinforcing ribs is arranged at the same position as a front side surface of the annular protruding portion or further toward a rear side than the front side surface of the annular protruding portion.

5. The gear housing for an electric power steering device according to claim 3, wherein
   at least one reinforcing rib of the reinforcing ribs spans between a portion of the annular protruding portion closest to the worm housing portion and the worm housing portion.

6. The gear housing for an electric power steering device according to claim 1, wherein
   the front-side housing comprises at least one boss portion on the front-side surface that protrudes further toward a front side than surrounding portions of the at least one boss portion.

7. An electric power steering device, comprising:
   a worm reducer having the worm shaft of claim 1 rotated and driven by an electric motor, the worm of claim 1 provided at an intermediate portion of the worm shaft, and the worm wheel of claim 1 engaging with the worm; and
   the gear housing of claim 1 for housing the worm reducer inside; wherein
   the gear housing is configured for an electric power steering device according to claim 1.

8. A manufacturing method for a gear housing for an electric power steering device, the gear housing for an electric power steering device comprising:
   a front-side housing and a rear-side housing combined in a front-rear direction;
   the front-side housing comprising: a worm wheel housing portion housing a worm wheel inside, a worm housing portion housing a worm shaft inside, and one or more reinforcing ribs;
   the worm wheel housing portion having: a worm wheel cylindrical portion arranged around the worm wheel; and a disk shaped worm wheel bottom portion bent inward in a radial direction from a front end portion of the worm wheel cylindrical portion;
   the worm housing portion provided on a part in a circumferential direction of an outer-diameter side portion of the worm wheel housing portion;
   the reinforcing ribs provided on a front side surface of the front-side housing, extending in a direction in which an engagement reaction force acts between the worm wheel and a worm that is provided on the worm shaft, and spanning between the worm housing portion and the worm wheel bottom portion,
   a mounting stay protruding toward a front side from the worm wheel bottom portion and for supporting the front-side housing to a vehicle body, and
   at least one reinforcing rib of the reinforcing ribs being continuous with the mounting stay,
   wherein
   the manufacturing method comprises manufacturing the front-side housing by casting or injection molding of a synthetic resin using a mold having a cavity, material is allowed to flow in the cavity from a worm housing portion forming space side for forming the worm housing portion to a worm wheel housing portion forming space side for forming the worm wheel housing portion.

* * * * *